(12) United States Patent
Fondeur et al.

(10) Patent No.: US 7,715,671 B2
(45) Date of Patent: May 11, 2010

(54) ASYMMETRIC MACH-ZEHNDER INTERFEROMETER HAVING A REDUCED DRIVE VOLTAGE COUPLED TO A COMPACT LOW-LOSS ARRAYED WAVEGUIDE GRATING

(75) Inventors: Barthelemy Fondeur, San Jose, CA (US); David J. Dougherty, Mountain View, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/748,036

(22) Filed: May 14, 2007

(65) Prior Publication Data
US 2008/0044122 A1 Feb. 21, 2008

Related U.S. Application Data

(60) Provisional application No. 60/801,651, filed on May 19, 2006.

(51) Int. Cl.
G02B 6/34 (2006.01)
G02B 6/26 (2006.01)
(52) U.S. Cl. .............................. 385/37; 385/31; 385/32
(58) Field of Classification Search .................. 385/37, 385/31, 32
See application file for complete search history.

(56) References Cited

U.S. PATENT DOCUMENTS

| 5,412,744 | A | 5/1995 | Dragone | 385/24 |
|---|---|---|---|---|
| 5,488,680 | A | 1/1996 | Dragone | 385/24 |
| 6,289,151 | B1 * | 9/2001 | Kazarinov et al. | 385/32 |
| 6,587,615 | B1 | 7/2003 | Paiam | 385/24 |
| 6,728,446 | B2 | 4/2004 | Doerr | 385/37 |
| 6,922,510 | B2 * | 7/2005 | Hatanaka | 385/50 |
| 7,212,326 | B2 * | 5/2007 | Wooten et al. | 359/245 |
| 2003/0035609 | A1 * | 2/2003 | Hatanaka | 385/15 |
| 2003/0128926 | A1 | 7/2003 | Doerr | 385/37 |
| 2006/0056002 | A1 * | 3/2006 | Wooten et al. | 359/245 |
| 2007/0086699 | A1 * | 4/2007 | Doerr | 385/24 |
| 2007/0133918 | A1 * | 6/2007 | Cho et al. | 385/1 |
| 2008/0031566 | A1 * | 2/2008 | Matsubara et al. | 385/14 |

FOREIGN PATENT DOCUMENTS

| WO | 01/33270 | 5/2001 |
|---|---|---|
| WO | 04/001470 | 12/2003 |

OTHER PUBLICATIONS

Kaneko et al., "Design and Applications of Silica-Based Planar Lightwave Circuits", IEEE Journal of Selected Topics in Quantum Electronics, vol. 5, No. 5, Sep./Oct. 1999, pp. 1227-1236.

* cited by examiner

*Primary Examiner*—K. Cyrus Kianni
(74) *Attorney, Agent, or Firm*—Matthew A. Pequignot; Pequignot + Myers LLC

(57) ABSTRACT

The invention relates to an asymmetric Mach Zehnder Interferometer (MZI) having a reduced drive voltage, coupled to a compact low-loss arrayed waveguide grating (AWG) to provide a broader passband with low ripple. The integrated device has a compact stackable design for improved manufacturing yield. Inputs and outputs of the device are disposed in alignment on opposite sides of a silicon chip with the MZI having an opposite curvature to the AWG. To achieve this alignment, waveguide arms of the MZI are crossed without coupling between them before the optical signal is combined and coupled into the AWG.

9 Claims, 13 Drawing Sheets

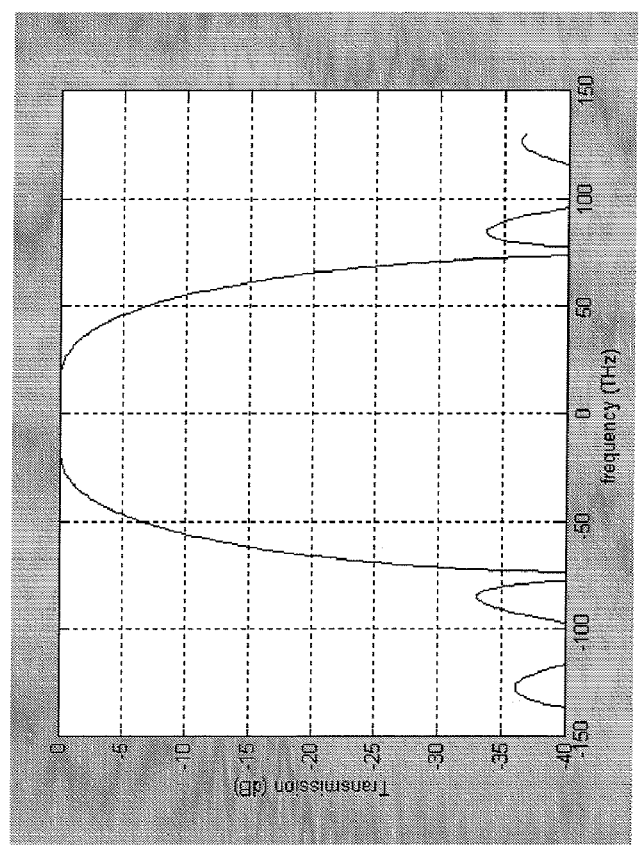
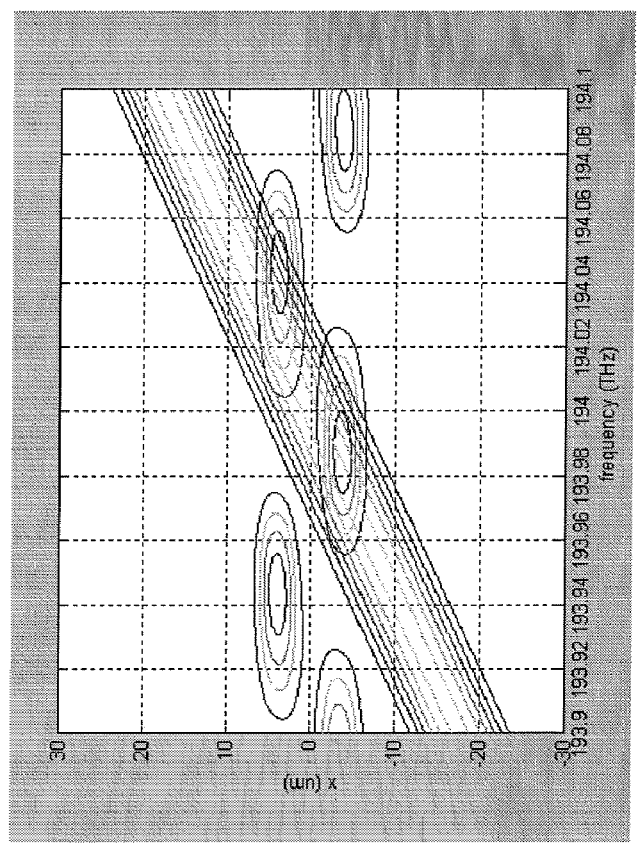
Fig. 6A
Fig. 6B

ASYMMETRIC MACH-ZEHNDER INTERFEROMETER HAVING A REDUCED DRIVE VOLTAGE COUPLED TO A COMPACT LOW-LOSS ARRAYED WAVEGUIDE GRATING

CROSS-REFERENCE TO RELATED APPLICATIONS

This application claims priority from U.S. provisional application No. 60/801,651 filed May 19, 2006, which is incorporated herein by reference for all purposes.

MICROFICHE APPENDIX

Not Applicable.

TECHNICAL FIELD

The present application relates to an integrated arrayed waveguide grating (AWG) multiplexer/demultiplexer having an asymmetric input Mach Zehnder interferometer (MZI) to enable a broader passband with low ripple, particularly an integrated MZI-AWG having a compact design for more efficient manufacture.

BACKGROUND OF THE INVENTION

Increasing the transmission capacity in optical networks requires demultiplexers such as AWG's (also termed waveguide grating router WGR) with wider passband and lower ripple within the passband, particularly since the higher bit-rate signals propagated through the optical networks have wider spectra to be transmitted. Moreover, optical networks using reconfigurable optical add-drop modules (ROADM) have optical signals passing through cascades of demultiplexers and multiplexers. Hence, loss at each stage must be minimized.

AWG "flat-top" designs, where the passband has as broad and flat a shape as possible, have been proposed in the past to widen the passband to expand the transmission characteristics. One example of flat-top AWG's is based on a parabolic horn design, which enables an increase in the 0.5 dB passband to about 50% of the channel spacing, at the expense of some penalty loss.

Other designs have been proposed to improve the passband characteristics with reduced penalty loss, such as in U.S. Pat. No. 5,488,680 by Corrado Dragone in the name of AT&T Corp. As shown in FIG. 1, this prior art design 10 includes a first frequency routing element 12 having at least one input port and P output ports, where P>2 coupled to a grating 14. This approach gives a wide passband with significantly reduced insertion loss compared to the parabolic horn design. In one configuration, Dragone discloses a Mach-Zehnder structure 12 coupled to the input of the AWG 14. The MZI 12 is composed of an input Y-branch coupler 16 which splits the optical power equally in two waveguide arms of different lengths 18, 18', and a 3 dB coupler 20 at the slab 22 interface of the AWG 14. The MZI 12 disclosed has the same curvature as the second grating 14, meaning that the shorter waveguide 18 of the MZI 12 is on the same side as the shorter arm of the grating One inconvenience of this structure is that it cannot be stacked compactly, which reduces the total number of devices one can print on one wafer.

A similar integrated structure is disclosed in U.S. Pat. No. 6,728,446 by C. R. Doerr in the name of Lucent Technologies Inc. Doerr shows an alternative design 30, seen in FIG. 2, which allows one to stack the MZI-AWG and maximize the number of waveguides. In this layout, the MZI 32 is composed of one Y-branch coupler 34, two waveguide arms of different delays 36, 36', which are coupled into a full 180 degree coupler 38 which transfers the energy of each arm 36, 36' into the other arm, and finally a 3 dB coupler 40 at the slab 44 interface of the AWG 42. The 180 degree coupler 38 added in this design allows Doerr to "flip" the curvature of the MZI 32, making the overall layout more compact and stackable. However, the fabrication challenge of realizing a perfect 180 degree coupler that transfers 100% of the light from one arm to the other one across a broad wavelength spectrum is prohibitive. Process variations, wavelength and polarization sensitivity of the coupler can all lead to degraded performance for the overall passband shape in the form of polarization dependent loss (PDL), chromatic dispersion (CD) and polarization mode dispersion (PMD).

A stackable AWG with a broad flat-top passband which overcomes the limitations of the prior art remains highly desirable.

SUMMARY OF THE INVENTION

Accordingly, an object of the present invention is to provide an integrated MZI-AWG which gives a broader passband with a substantially flat top, having a compact, stackable design.

It is a further object of the present invention to provide an input MZI having a reduced drive voltage.

The present invention has found that creating an asymmetric input MZI in which the long arm is physically crossed over the shorter before the coupler input into the AWG, the passband broadening effects can be achieved in a stackable design at low loss, without the manufacturing and performance drawbacks of a directional coupler.

Thus an aspect of the present invention provides an optical multiplexer/demultiplexer comprising: an asymmetric Mach Zehnder interferometer (MZI) optically coupled to an arrayed waveguide grating (AWG), wherein the MZI includes a pair of waveguide arms having an optical path length difference between them, disposed such that the pair of waveguide arms cross each other substantially without optical coupling between them, and together define a first curvature, and the AWG is adapted to spatially separate an optical signal of multiple wavelengths into optical channels having a predefined channel spacing between them, the AWG defining a second curvature, opposite to the first curvature, and wherein the MZI has a free spectral range (FSR) substantially equal to the channel spacing of the AWG.

In particular, the present invention provides a MZI comprising an input directional coupler for dividing light introduced into an input port substantially equally between the pair of waveguide arms and optically coupling the light at an output directional coupler for coupling into the AWG, wherein the path length difference between the pair of waveguide arms is approximately c/n/dnu, where c is the speed of light, n the effective index, and dnu is the channel spacing of the AWG.

In embodiments of the invention, the input directional coupler includes a first and a second input port, the first input port having a difference in phase from the second input port equal to half the channel spacing of the AWG.

In a further embodiment, present invention includes an optical phase shifter associated with the pair of waveguide arms.

In alternative embodiments of the invention, an optical multiplexer/demultiplexer comprises: an asymmetric Mach Zehnder interferometer (MZI) optically coupled to an arrayed waveguide grating (AWG), wherein the MZI includes a pair of waveguide arms having an optical path length difference between them, disposed such that the pair of waveguide arms cross each other substantially without optical coupling between them, and together define a first curvature, and the AWG is adapted to spatially separate an optical signal of multiple wavelengths into optical channels having a predefined channel spacing between them, the AWG defining a second curvature, opposite to the first curvature.

The invention further provides an optical multiplexer/demultiplexer wherein an optical field of the MZI is substantially synchronized to an optical field of the AWG.

An embodiment of the invention further including an optical phase shifter associated with the pair of waveguide arms of the MZI for tuning the synchronization of the optical field of the MZI to the optical field of the AWG.

BRIEF DESCRIPTION OF THE DRAWINGS

Further features and advantages of the present invention will become apparent from the following detailed description, taken in combination with the appended drawings, in which:

FIG. 6A is a graph superimposing FIG. 5A and FIG. 5B;

FIG. 6B is a graph of the resulting transmission from FIG. 6A;

It will be noted that throughout the appended drawings, like features are identified by like reference numerals.

DETAILED DESCRIPTION OF THE PREFERRED EMBODIMENTS

Figure 1:
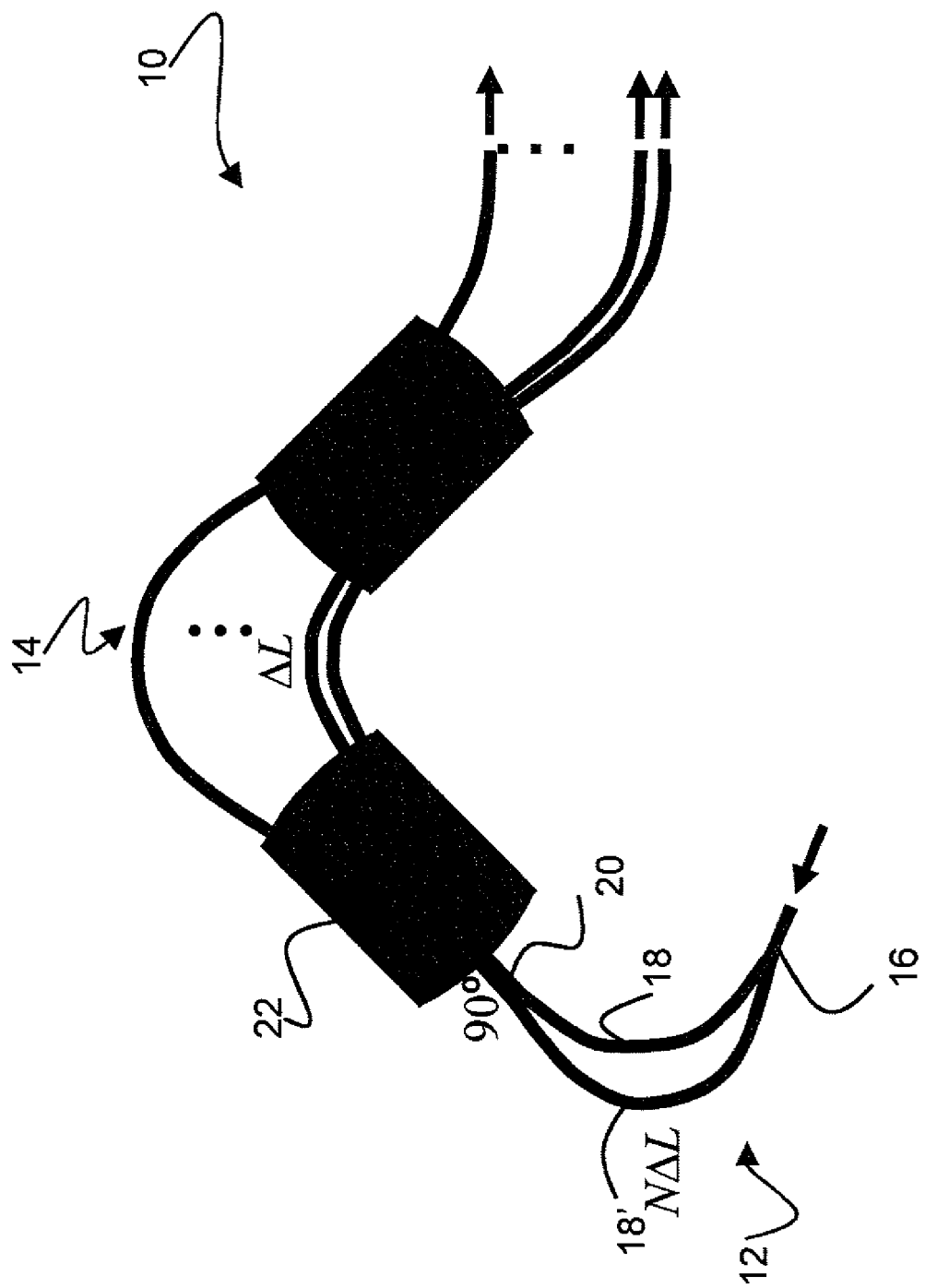
FIG. 1 is a schematic illustration of an integrated MZI-AWG device as disclosed in the prior art.
Figure 2:
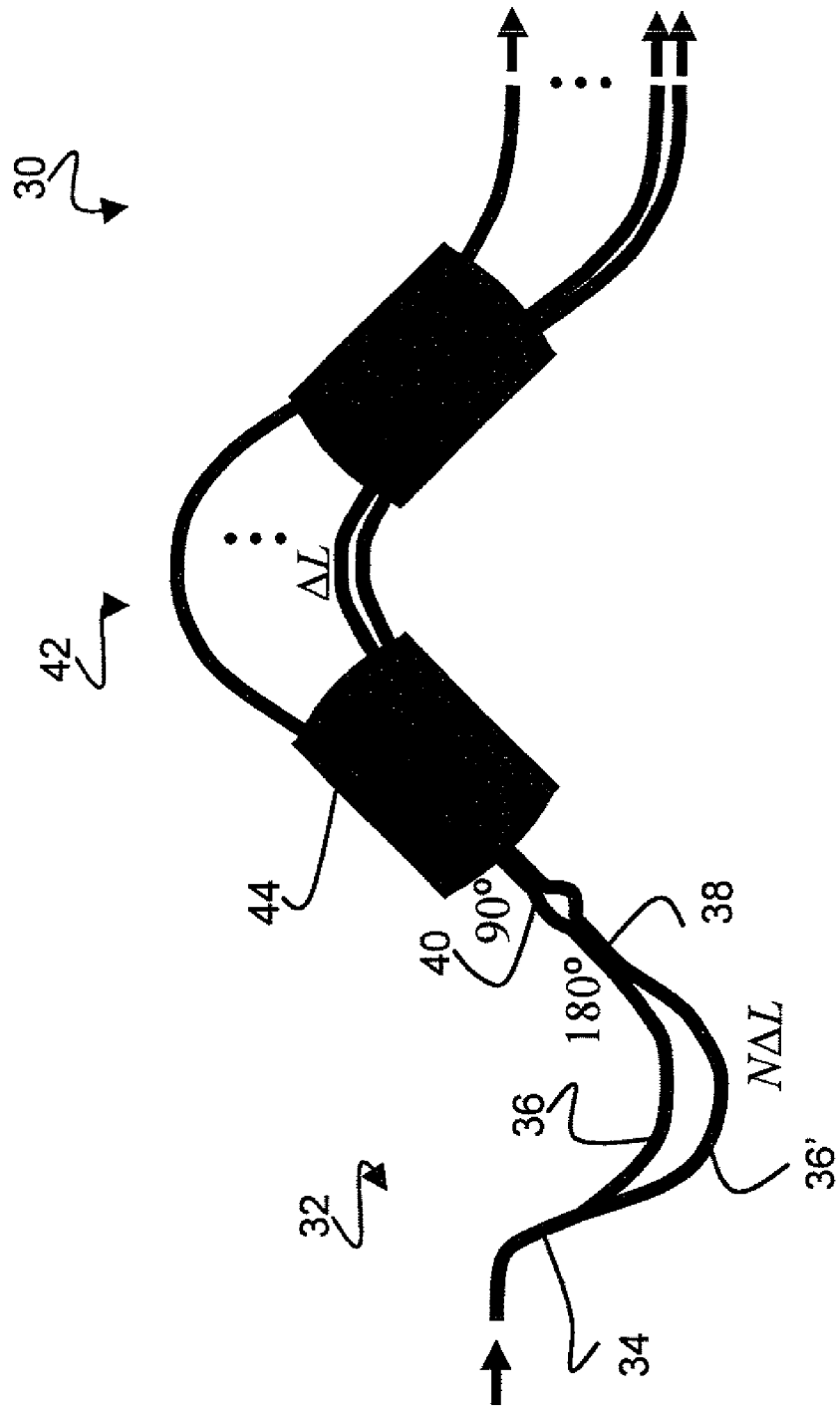
FIG. 2 is a schematic illustration of an integrated MZI-AWG device further including a directional coupler as disclosed in the prior art.
Figure 3:
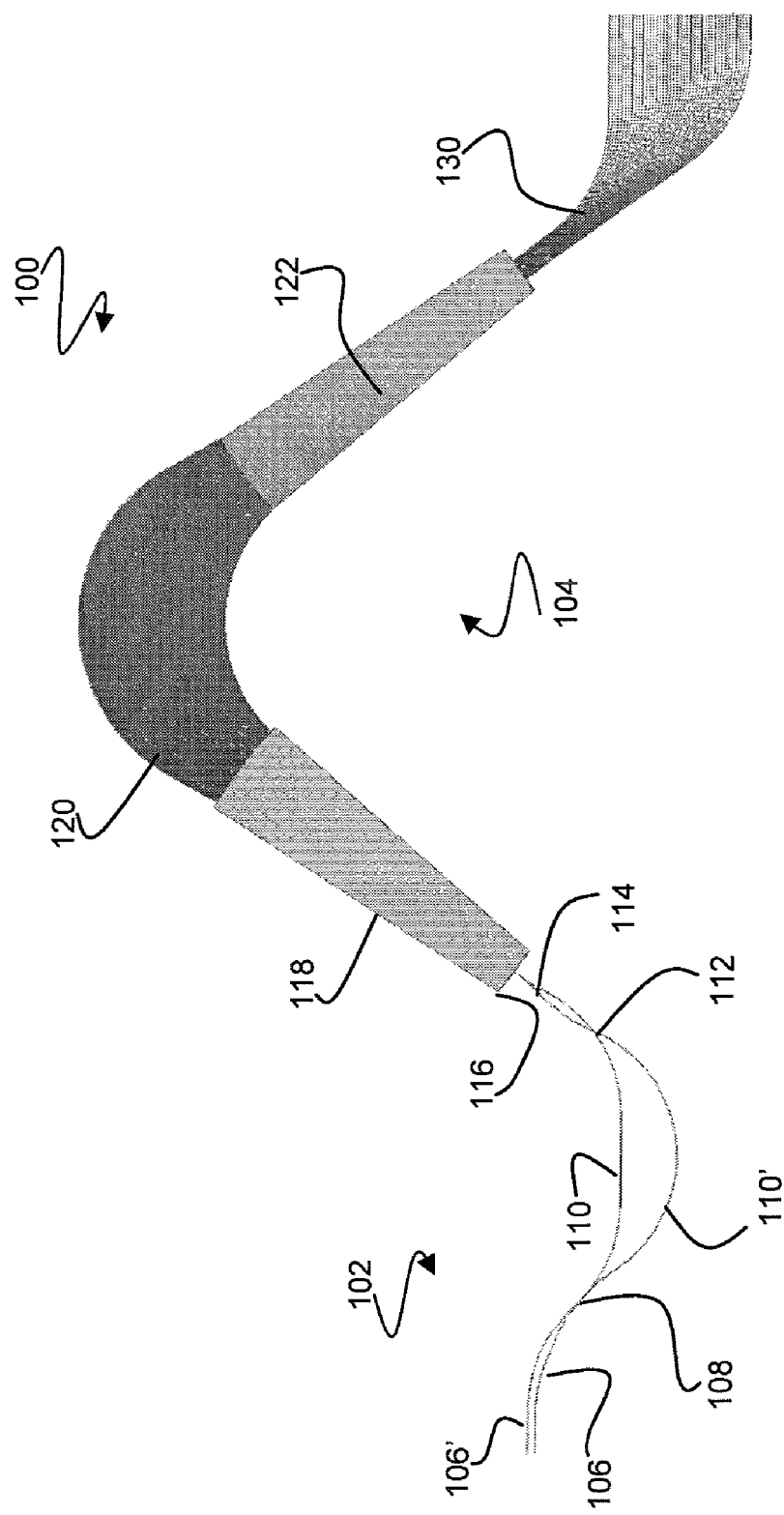
FIG. 3 is a schematic illustration of an integrated MZI-AWG in accordance with the present invention.
Figure 4:
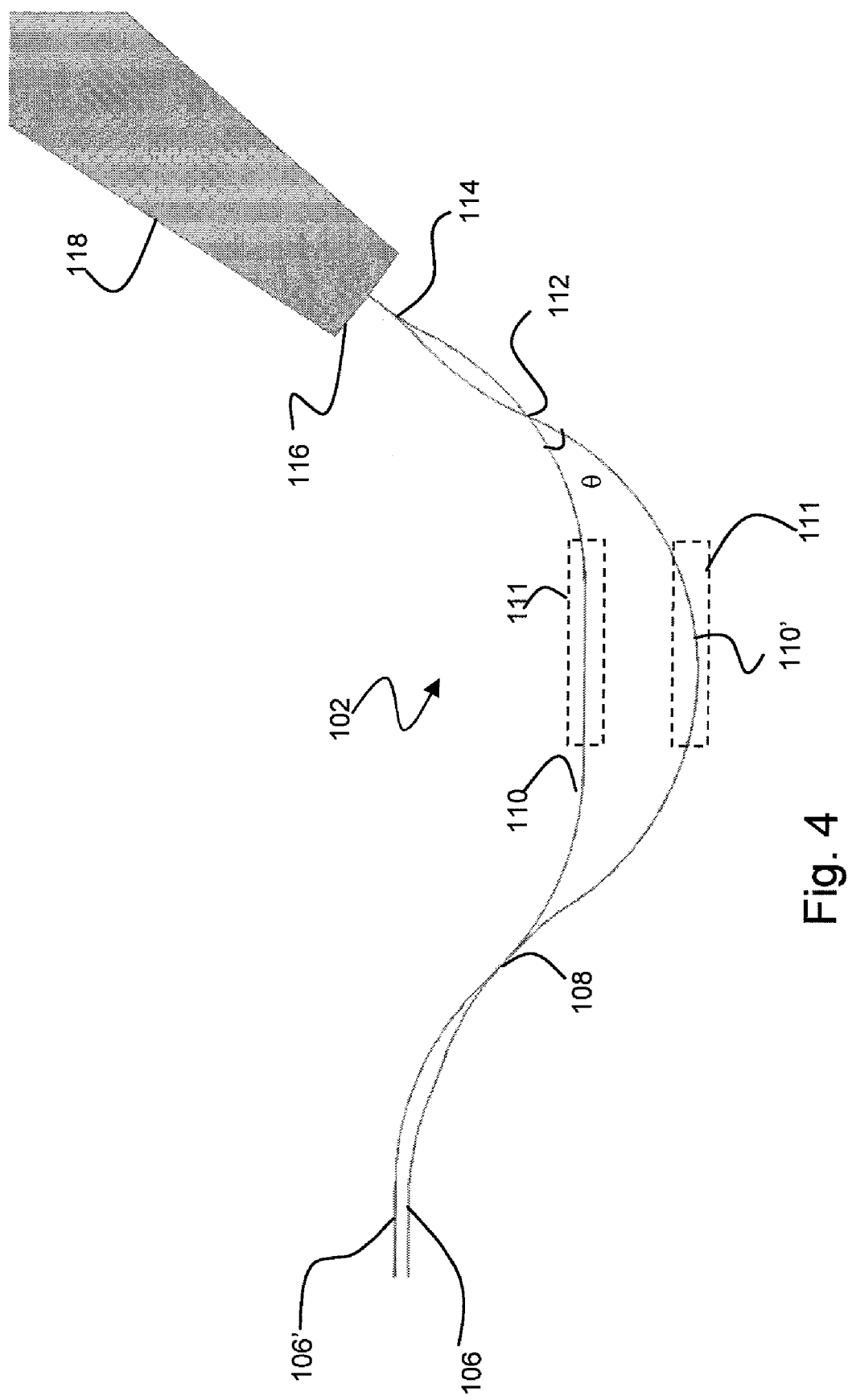
FIG. 4 is an enlarged partial view of the MZI portion of the device of FIG. 3.

FIG. 3 shows an integrated MZI-AWG device 100 in accordance with the present invention. The MZI 102 is coupled to an AWG 104 such that inputs 106 and 106' of the MZI 102 and outputs of the device 130 are substantially in line on opposite sides of a silicon chip, and such that the curvature of the waveguide arms 110, 110' of the MZI is opposite to that of the waveguide arms 120 of the AWG. The MZI 102 in accordance with the present invention couples light from inputs 106 and 106' in a directional coupler 108 which splits the light equally between waveguide arms 110, 110'. A selected phase delay is created by the path length difference of the two arms 110, 110'. It is important that the longer path length waveguide 110' be coupled to the slab interface 116 of the slab free space region 118 at a location closer to the longer path length region of the AWG waveguide arms 120; while the shorter path waveguide 110 is coupled to the slab interface 116 at a location closer to the shorter path length region of the AWG waveguide arms 120. To achieve this with the opposite curvature between the MZI 102 and the AWG 104, the waveguides 110, 110' are crossed at 112. This reverses the position of the phase delayed input 110' into the slab 118 without the complexity of a 180 degree directional coupler.

The device 100 is manufactured as an integrated planar silicon waveguide device. The MZI 102 comprises two channel waveguide inputs 106 and 106' coupled into a 3 dB directional coupler 108, the outputs of which are channel waveguides 110, 110'. These channel waveguides 110, 110' have a path length difference between them close to c/n/dnu, where c is the speed of light, n the effective index, and dnu the channel spacing of the AWG. The optical channel waveguide crossing 112 is designed so that substantially no coupling of light occurs between the two optical channel waveguides 110, 110' at the cross point 112. Channel waveguides 110, 110' are coupled in a final 3 dB directional coupler 114 and input into the slab 118 of the AWG structure 104. The resulting Mach-Zehnder has a free spectral range equal to the channel spacing of the AWG. The AWG 104 includes slab 118 coupled into the waveguide grating 120, which is optically coupled into slab 122, and finally output channel waveguides 130. The AWG spatially separates an optical signal comprising a plurality of wavelengths in a wavelength division multiplexed (WDM) regime into channels of wavelength bands. Each channel has a center frequency and a channel spacing equal to the difference in frequency between center frequencies.

To understand how the Mach-Zehnder contributes to a low-loss wide-band response, one can look at what happens at the entrance plane 116 of the slab 118. The transmission of the MZI-AWG is equal to the convolution of the field imaged by the MZI (at the left of this plane) and the field imaged by the AWG (from the right of this plane).

Figure 5B:
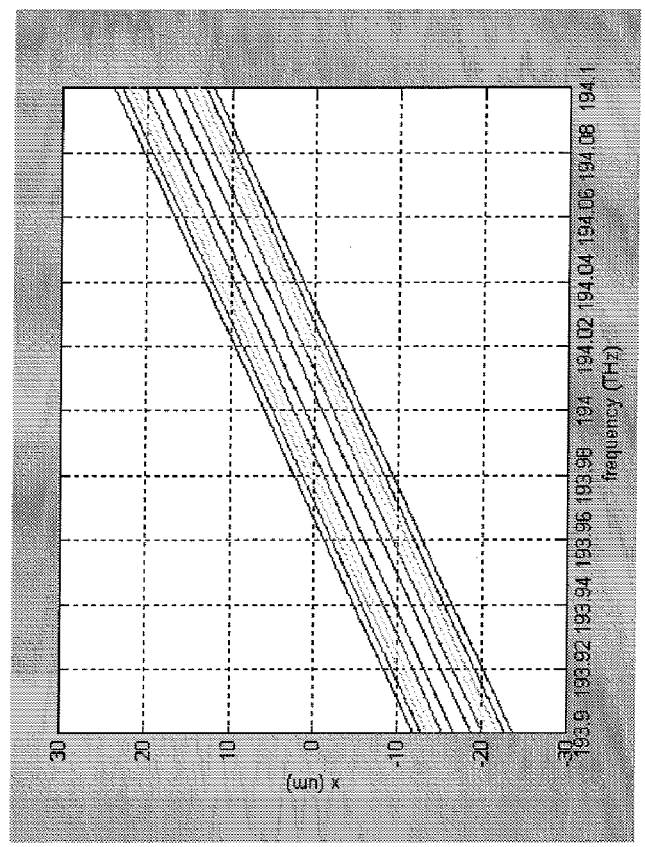
FIG. 5B is a graph of the optical field from the AWG in the same 100 GHz device.
Figure 5A:
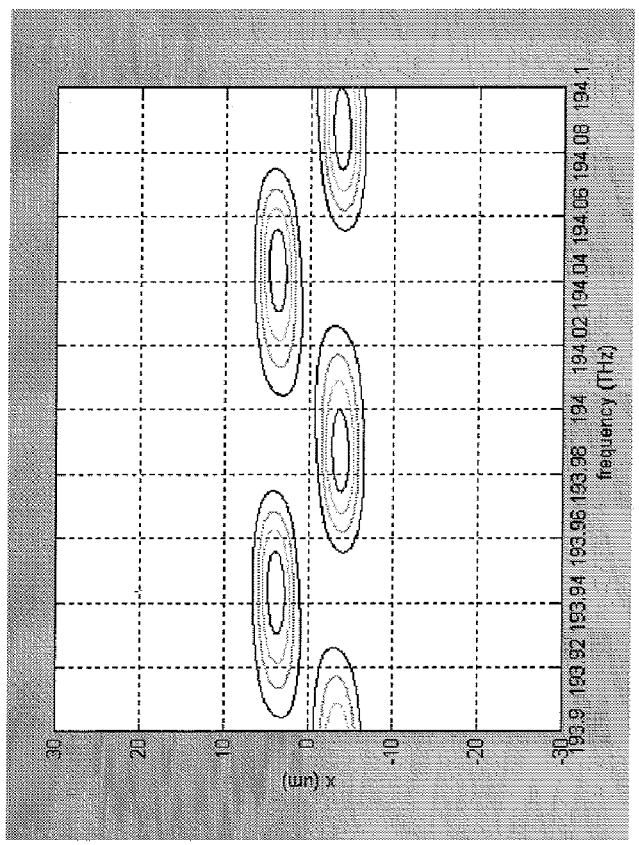
FIG. 5A is a graph of the optical field from the MZI for a 100 GHz spacing device.

The graph at FIG. 5A shows the field coming from the MZI for a 100 GHz spacing device. As the frequency changes, the light arriving into the two waveguides of the directional coupler 114 interfere with a different phase.

FIG. 5B shows the field coming from the AWG. As the frequency changes, the AWG translates the image of the output waveguide.

FIG. 6A shows the superposition of the two previous figures. At the center frequency (194 THz), the image coming from the array is well coupled to the image coming from the MZI in a symmetric way. It remains well coupled from 193.98

THz to 194.02 THz as the two fields superpose themselves roughly. FIG. 6B shows the resulting transmission, which has wide passband and good crosstalk.

Figure 7B:
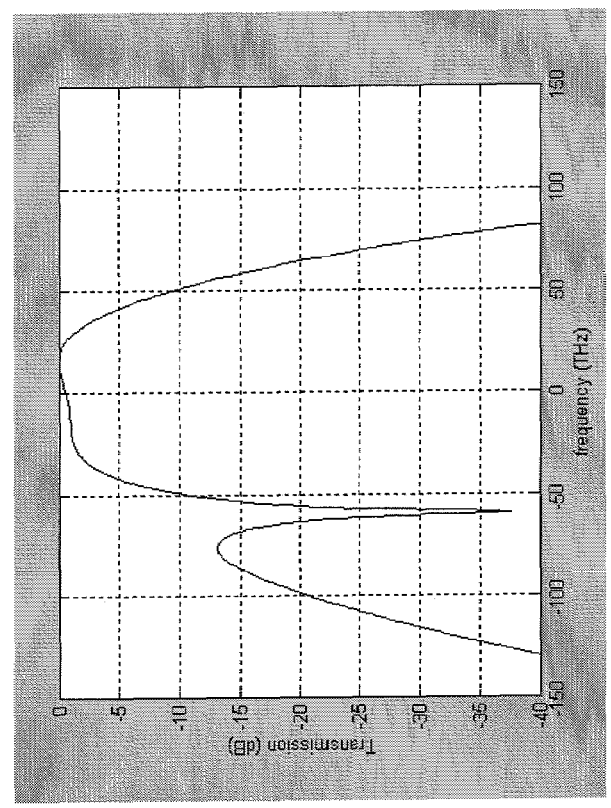
FIG. 7B is a graph of the resulting transmission from FIG. 7A.
Figure 7A:
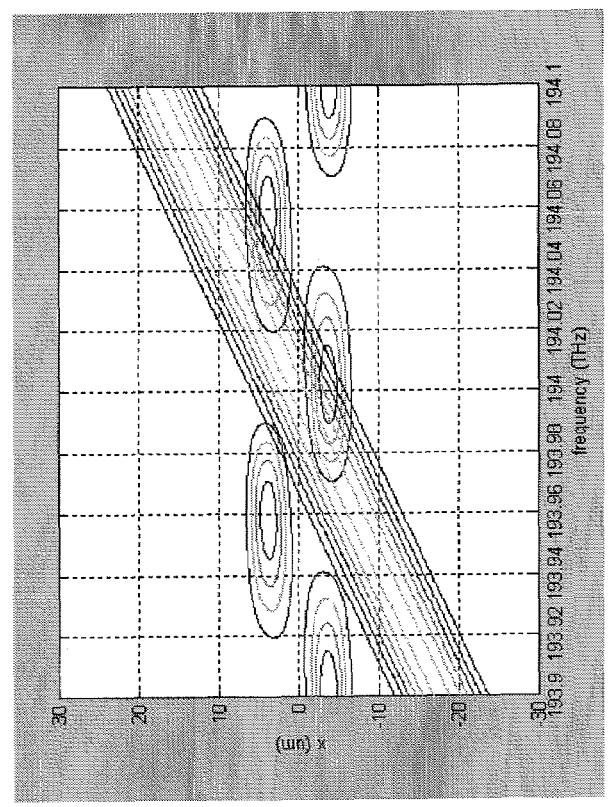
FIG. 7A is a graph of a MZI field incorrectly synchronized to an AWG image field.

Due to process variations, the MZI may not be tuned correctly to the AWG. In this instance, the image of the MZI will not be synchronized correctly to the image coming from the AWG, as shown for example in FIG. 7A. The resulting transmission, seen at FIG. 7B, becomes asymmetric and the passband and crosstalk degrades.

Placing heaters 11 on top of the MZI-arm 110/110' enables to tune the MZI to the AWG and correct for the process variation. By heating one or the other heaters, one can generate a phase shift from 0 to pi to correct the phase difference between the two arms 110 and 110'. Other known phase shifters, such as electro-optic phase shifters, can also be substituted.

In this invention, we found it advantageous to be able to use either of the two inputs 106 and 106' to reduce the maximum amount of heat needed to tune the MZI to the AWG. The two inputs 106 and 106' of the MZI have similar spectrum, but shifted by half the channel spacing, i.e. with a phase difference of pi. So, if one input of the MZI requires a small phase shift p0, the other input will give a spectrum totally out of phase at this phase shift, but will tune correctly at pi-p0. By choosing the input closest to the tuning setpoint, one needs to tune the MZI arms only from 0 to pi/2, thus reducing the maximum of heat needed to tune the MZI.

Figure 8B:
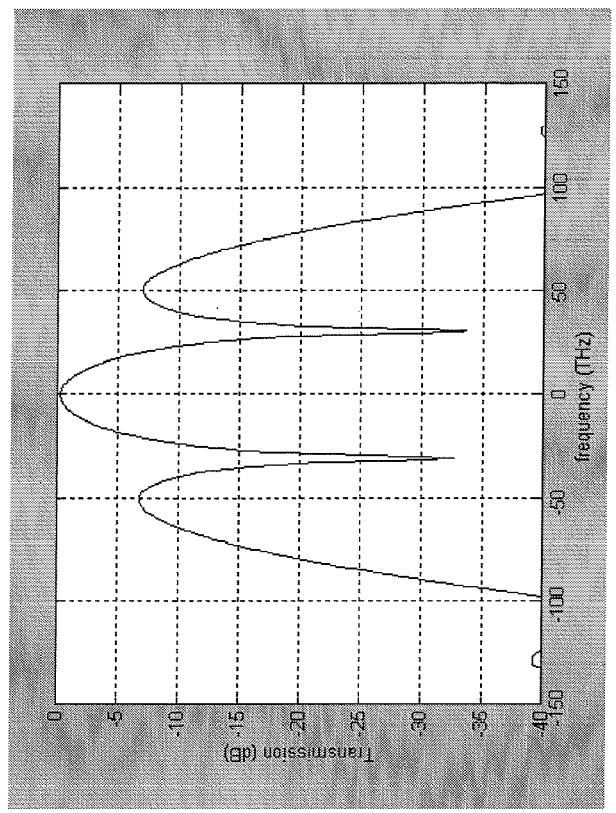
FIG. 8B is a graph of the resulting transmission from FIG. 8A.
Figure 8A:
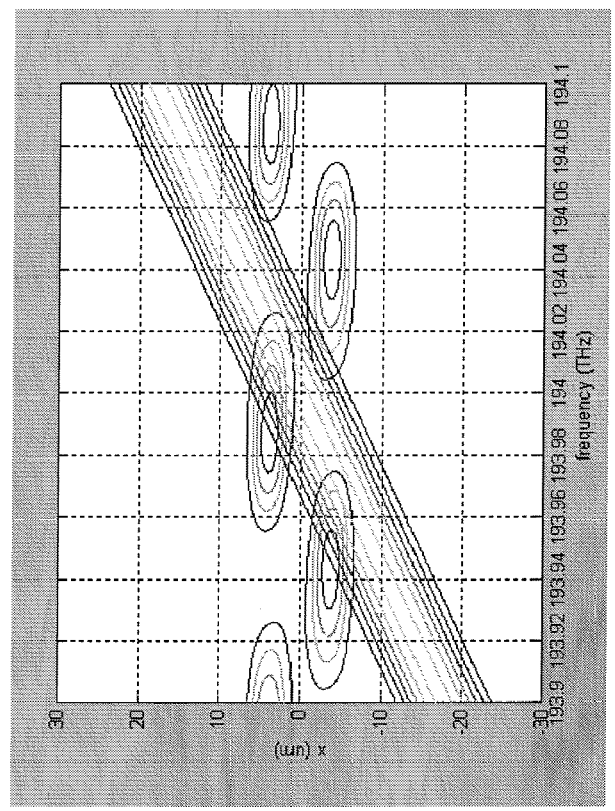
FIG. 8A is a graph of a MZI field and an AWG field, in which the MZI curvature is reversed without crossing the waveguide arms.

FIGS. 8A and 8B show what happens if the curvature in the MZI is reversed without crossing the waveguide arms 110, 110' At the center frequency (194 THz), the image coming from the array is coupled to the image coming from the MZI in a symmetric way (FIG. 8A). On the other hand, the two images separate themselves very quickly away from the center. FIG. 8B shows the resulting transmission, which is a very narrow passband with poor crosstalk.

Figure 9:
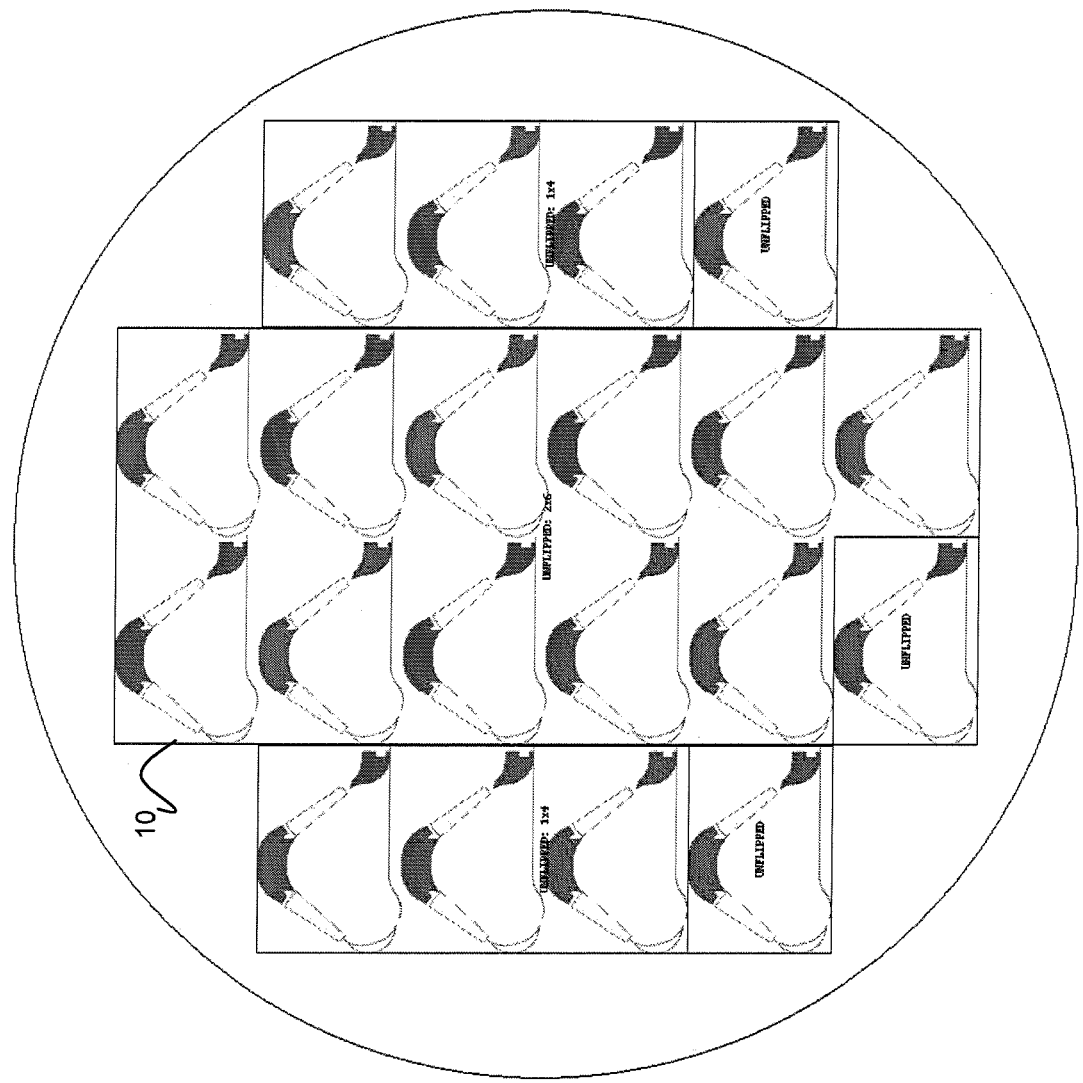
FIG. 9 is an illustration of the wafer scale layout of the prior art device of FIG. 1.
Figure 10:
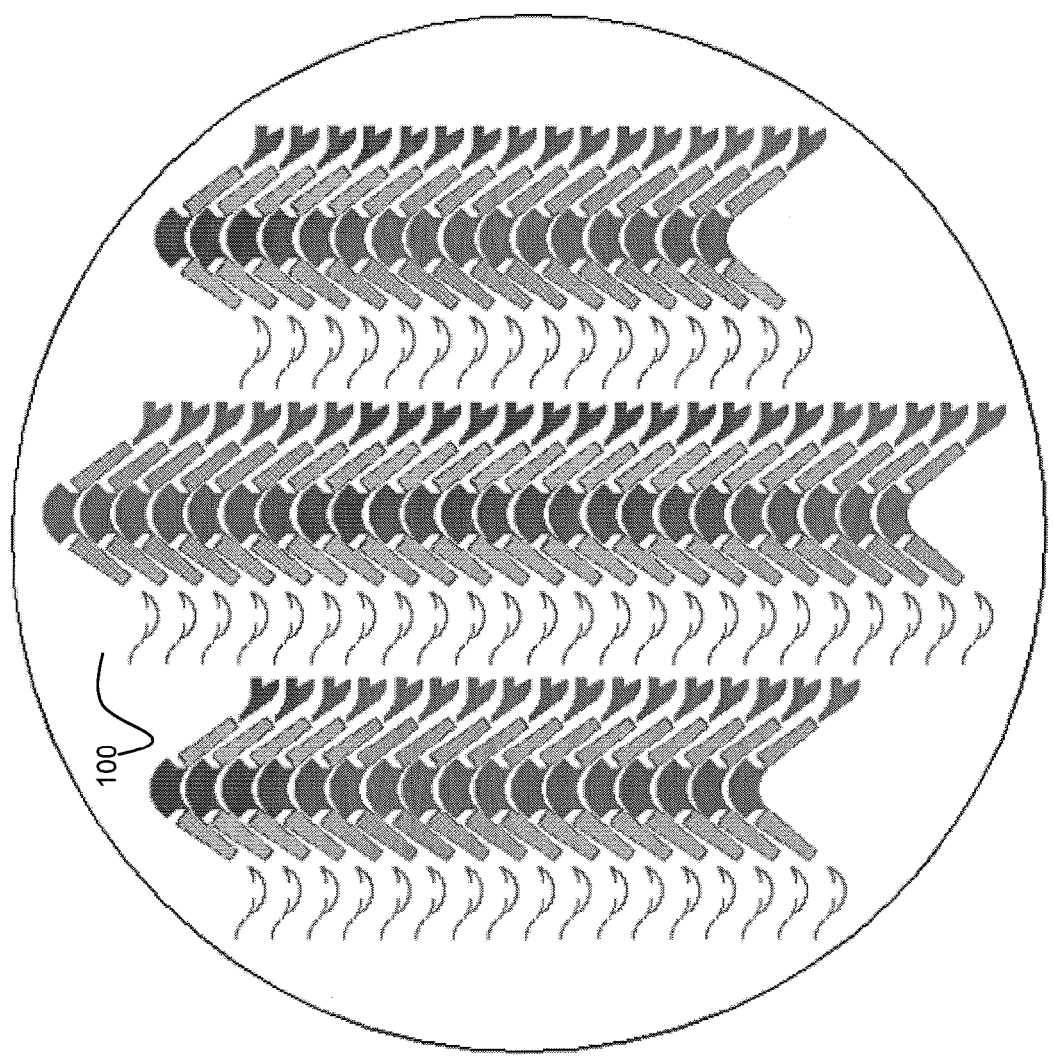
FIG. 10 is an illustration of the wafer scale layout of the device in accordance with the present invention.

FIG. 9 illustrates a wafer layout for the Dragone design in which 20 circuits can be printed on an 8 inch wafer. This can be compared to FIG. 10 which illustrates a tightly stacked wafer layout using the design in accordance with the present invention in which 57 circuits can be printed on an 8 inch wafer, a yield improvement of 100-150%.

This integrated MZI-AWG device 100 has a compact design suitable for efficient wafer yield, similar to the opposite curvature disclosed by Doerr, without the 180 degree directional coupler. A 180 degree coupler adds length to the device and wavelength sensitivity. Furthermore, Doerr teaches phase shifting compensation, such as a thermooptic phase shifter, between the 180 degree coupler and the 90 degree coupler to correct for the inevitable imperfections of the couplers.

Figure 11A:
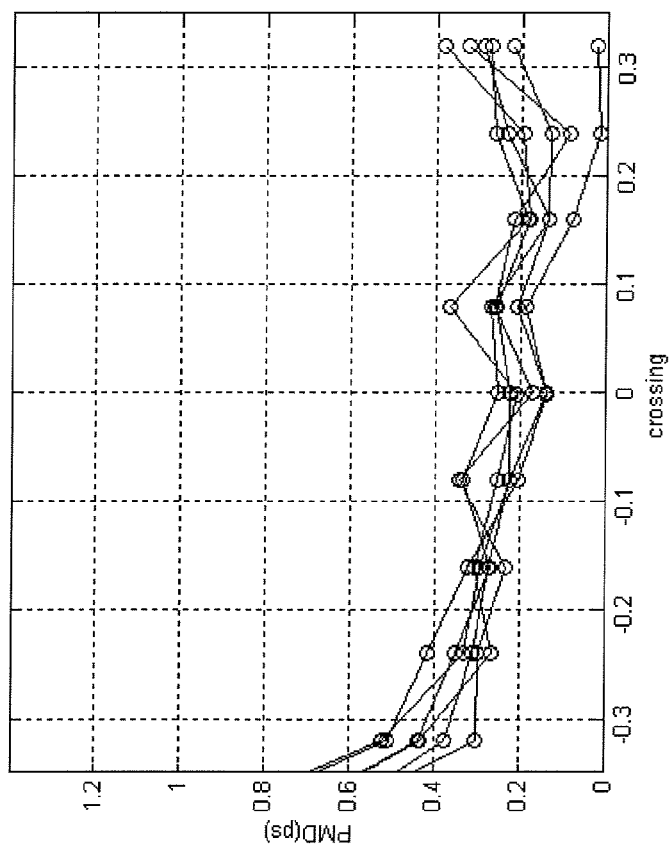
FIG. 11A is a graphic illustration of the superimposed spectra for multiple devices as shown in FIG. 2 including the 180 degree coupler measuring polarization mode dispersion (PMD) versus wavelength.
Figure 11B:
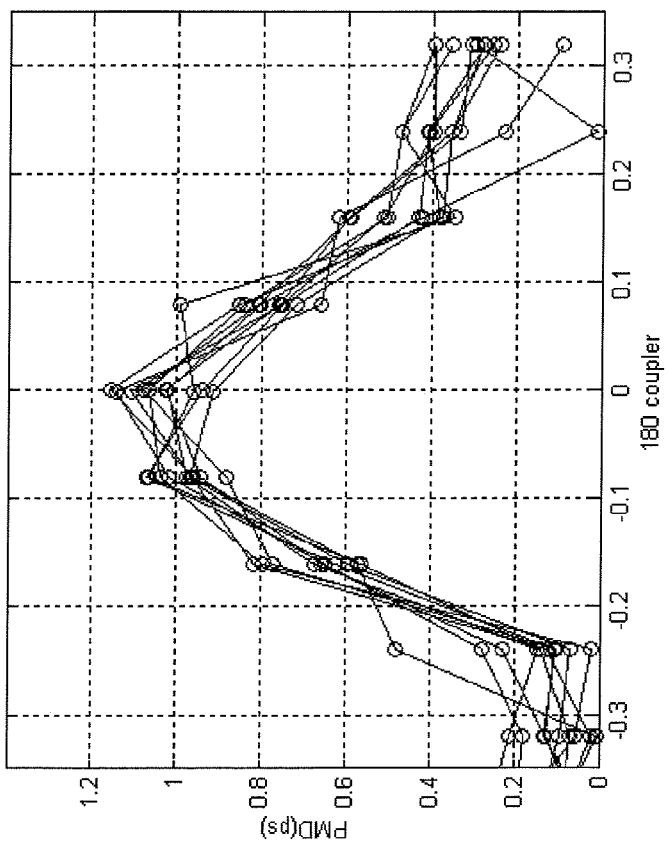
FIG. 11B is a graphic illustration of the superimposed spectra for multiple devices as shown in FIG. 3 using crossed waveguides measuring PMD versus wavelength.

FIGS. 11A illustrate the polarization mode dispersion (PMD) penalty associated with the 180 degree directional coupler. The 180 degree coupler is approximately twice as long as the 3 dB directional coupler. The graphs show superimposed spectra for several chips. The PMD penalty at the center of the passband of the Doerr device displays very high PMD, which is greatly reduced by using a crossed waveguide design, as light has to pass through less coupling region, thus reducing the overall PMD and its sensitivity to any process or stress variations as shown in FIG. 11B.

Figure 12:
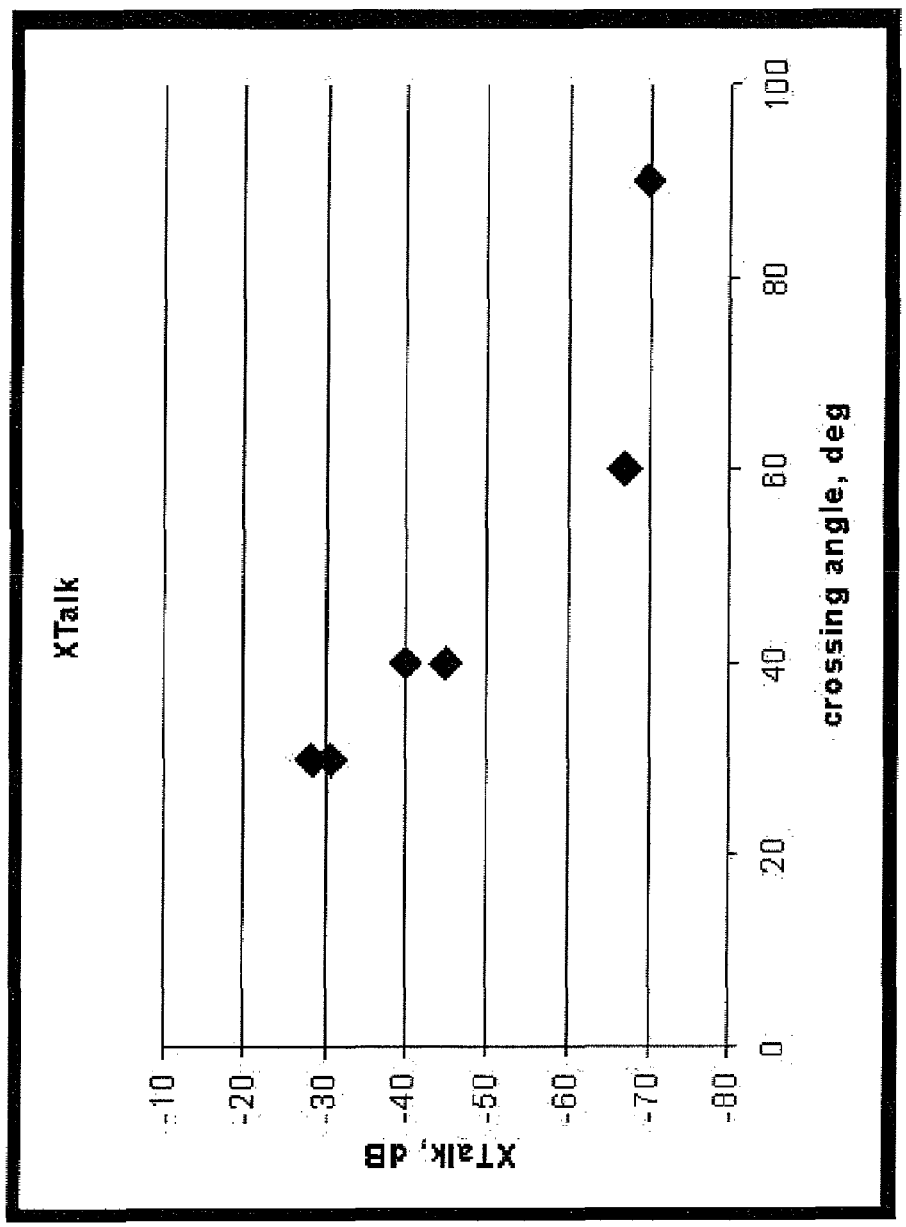
FIG. 12 is a graphic illustration of measured cross talk values for a range of waveguide crossing angles.
Figure 13:
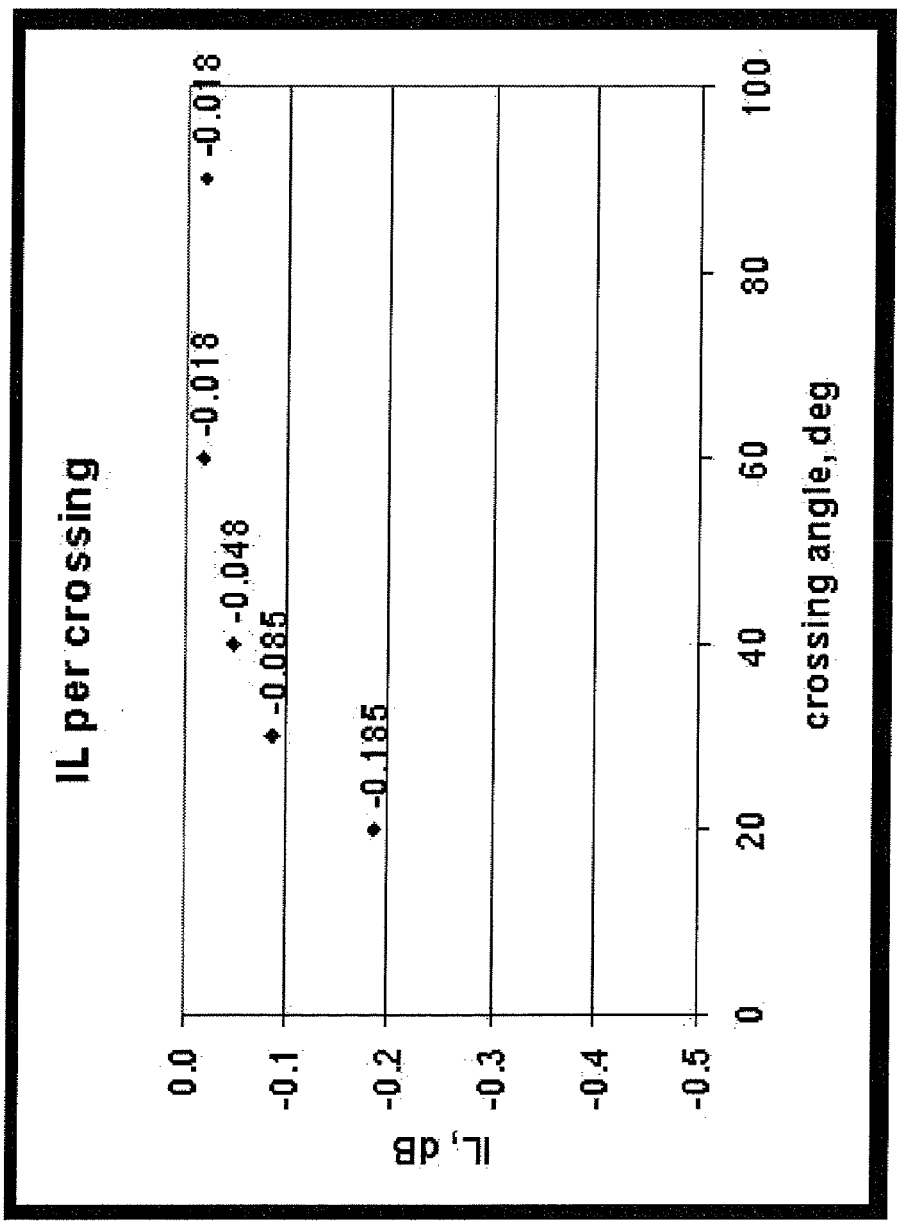
FIG. 13 is a graphic illustration of measured insertion loss for a range of waveguide crossing angles.

Crossed channel waveguides, as disclosed in the present invention, are relatively achromatic compared to the 180 degree coupler. Most of the light transmitted through the crossover 112 will pass through. A small percentage will either radiate in the cladding as stray light, or be guided in the other waveguide as crosstalk. The stray light can affect performance as it is radiating in the same direction as the coupler into the slab, and could be re-coupled into the AWG array. To minimize these unwanted effects which can generate insertion loss or crosstalk degradation, the angle of intersection must be high. In a preferred embodiment, the angle between the waveguides is 30 degrees. FIG. 12 shows the measured crosstalk in the other waveguide for decreasing angles of intersection θ from 90-30 degrees. Angles less than 30 degrees provide generally unacceptable crosstalk for most applications. Looking at the data in FIG. 13, the insertion loss is measured as a function of crossing angle between 20-90 degrees.

The present invention provides a relatively simple solution, which improves the passband performance over the costly and complex teaching of the prior art.

It should be understood that although the device in accordance with the present invention is described in association with a demultiplexing function, that as is well known in the art, the device can be operated in reverse as a multiplexer. In a reverse multiplexing operation, elements identified in the disclosure as inputs will be outputs and vice versa.

The embodiments of the invention described above are intended to be exemplary only. The scope of the invention is therefore intended to be limited solely by the scope of the appended claims.

What is claimed is:

1. An optical multiplexer/demultiplexer comprising:
   an asymmetric Mach Zehnder interferometer (MZI) optically coupled to an arrayed waveguide grating (AWG), wherein
   the MZI includes a first coupler for dividing an input optical signal between a pair of waveguide arms having an optical path length difference between them, disposed such that the pair of waveguide arms cross each other substantially without optical coupling between them, the waveguide arms being joined by a second coupler coupled to the AWG, for optically coupling an optical signal into the AWG, wherein the waveguide arm with the longer optical path length crosses over the waveguide arm with the shorter optical path length between the first and second couplers, so that light from the waveguide arm with the longer optical path length is coupled to a slab region of the AWG at a location closer to a longer path length region of the AWG waveguide grating, while light from the waveguide arm with the shorter optical path length is coupled to the slab region at a location closer to a shorter path length region of the AWG waveguide grating, and together the pair of waveguide arms define a first curvature, and
   the AWG is adapted to spatially separate an optical signal of multiple wavelengths into optical channels having a predefined channel spacing between them, the AWG defining a second curvature, opposite to the first curvature, and wherein
   the MZI has a free spectral range (FSR) substantially equal to the channel spacing of the AWG.

2. The optical multiplexer/demultiplexer defined in claim 1, wherein the MZI comprises an input directional coupler for dividing light introduced into an input port substantially equally between the pair of waveguide arms and optically coupling the light at an output directional coupler for coupling into the AWG, wherein the path length difference between the pair of waveguide arms is approximately c/n/dnu, where c is the speed of light, n the effective index, and dnu is the channel spacing of the AWG.

3. The optical multiplexer/demultiplexer defined in claim 2, wherein the pair of waveguide arms cross each other at an angle of at least 30 degrees.

4. The optical multiplexer/demultiplexer defined in claim 2, wherein the input directional coupler includes a first and a second input port, the first input port having a difference in phase from the second input port equal to half the channel spacing of the AWG.

5. The optical multiplexer/demultiplexer defined in claim 4, further including an optical phase shifter associated with the pair of waveguide arms.

6. The optical multiplexer/demultiplexer defined in claim 5, wherein the optical phase shifter comprises a heater disposed above at least one of the pair of waveguide arms.

7. The optical multiplexer/demultiplexer defined in claim 1 comprising an integrated silicon waveguide device.

8. The optical multiplexer/demultiplexer defined in claim 1, wherein an at least one input port of the MZI and a plurality of output ports of the AWG are disposed on opposite sides of a silicon chip.

9. An optical multiplexer/demultiplexer comprising:
an asymmetric Mach Zehnder interferometer (MZI) optically coupled to an arrayed waveguide grating (AWG), wherein
the MZI includes a pair of waveguide arms having an optical path length difference between them, disposed such that the pair of waveguide arms cross each other substantially without optical coupling between them, and together define a first curvature the waveguide arms being joined by a coupler coupled to the AWG, for optically coupling an optical signal into the AWG, and
the AWG is adapted to spatially separate an optical signal of multiple wavelengths into optical channels having a predefined channel spacing between them, the AWG defining a second curvature, opposite to the first curvature.

* * * * *